(12) United States Patent
Lin

(10) Patent No.: US 6,565,948 B1
(45) Date of Patent: May 20, 2003

(54) LAMINATED ORNAMENTAL GLASS

(76) Inventor: Chii-Hsiung Lin, No. 55, Dai Jen Street, Kaohsiung (TW)

( * ) Notice: Subject to any disclaimer, the term of this patent is extended or adjusted under 35 U.S.C. 154(b) by 0 days.

(21) Appl. No.: 08/538,174

(22) Filed: Aug. 23, 1995

Related U.S. Application Data

(63) Continuation of application No. 08/237,650, filed on May 4, 1994, now abandoned.

(51) Int. Cl.$^7$ .............................. B32B 27/14; B32B 3/00
(52) U.S. Cl. ...................... 428/195; 428/210; 428/428; 156/62
(58) Field of Search ................................ 428/195, 210, 428/428; 156/62; 65/60.52

(56) References Cited

U.S. PATENT DOCUMENTS

| | | | | |
|---|---|---|---|---|
| 3,990,784 A | * | 11/1976 | Gelber | 350/166 |
| 5,030,503 A | * | 7/1991 | Carter et al. | 428/195 |
| 5,091,003 A | * | 2/1992 | Boaz | 106/20 |
| 5,137,560 A | * | 8/1992 | Ohmura et al. | 65/60.52 |
| 5,189,952 A | * | 3/1993 | Ohmura et al. | 101/211 |
| 5,269,858 A | * | 12/1993 | Silverman | 156/62 |
| 5,294,494 A | * | 3/1994 | Yang | 428/426 |

* cited by examiner

*Primary Examiner*—William Krynski
(74) *Attorney, Agent, or Firm*—Orum & Roth

(57) ABSTRACT

A laminated ornamental glass suitable for indoor and outdoor use. The glass includes a first coating layer having a pattern of opaque regions applied to one side of the glass, a second coating layer having a pattern of white regions disposed on the pattern of opaque regions of the first coating layer, and a third oil ink coating layer with a pattern of black or grey regions disposed on the pattern of white regions of the second coating layer. The first, second and third coating layers leave transparent coating-free crevice portions between the regions thereof, wherein said coating layers permit visibility through said glass when viewed from one side of said glass, without reflection and virtual or static images, but not when viewed from an other side of said glass.

23 Claims, 4 Drawing Sheets

(2 of 4 Drawing Sheet(s) Filed in Color)

LAMINATED ORNAMENTAL GLASS

This application is a continuation of application Ser. No. 08/237,650, filed May 4, 1994, abandoned.

BACKGROUND OF THE INVENTION

This invention relates to laminated ornamental glass which can be used for many constructional purposes, not only indoors as interior partitions, walls, interior decoration or furniture but also outdoors as a decorative material, in a light-passable curtain wall or as the glass for doors and windows.

As living standards improve, people are paying more attention to the construction of outer walls of buildings, windows and doors as well as interior decoration, furniture and partitions, with corresponding regard to luminosity, safety and privacy.

Conventionally, the ornamental glass for an interior partition, such as a screen or an inlaid plate of wall, is prepared by printing a desired colored pattern directly onto a single sheet of glass, reprinting on or adhering by an adhesive directly to a glass substrate a desired colored pattern which is printed in advance on a resin film or paper, or printing a desired pattern of ceramic color frit onto a single sheet of glass followed by heat treatment and then coating a varnish on or adhering a resin film to said printed glass as a protective layer. As to the first two methods of producing conventional ornamental glass, the desired colored pattern printed by such methods on one of the surfaces of a single sheet of glass is exposed to the air, and is therefore subject to sunlight or oxidation so that the color of said pattern will change and fade, as well as being subject to damage when cleaning. In addition, among these aforementioned methods, some require a good printing technique for printing the desired colored pattern printed in advance on a resin film or paper on a sheet of glass, and glass-laminating skills for obtaining the desired delicate pattern as well as a bubble-free ornamental glass, so the cost of production is high. Moreover, the material of the colored pattern printed on conventional ornamental glass is an opaque glaze pigment, paint, oil ink or a mixture thereof which after a period of time will fade away while being exposed to sunshine (infrared ray or ultraviolet rays), so such ornamental glass can only be used indoors. Therefore, a laminated ornamental glass article which can be used indoors as well as outdoors and produced economically is desirable.

SUMMARY OF THE INVENTION

It is one object of the present invention that a laminated ornamental glass is provided which can be used indoors as well as outdoors, i.e. use is not restricted to interior partitions, screen walls or ornamental inlaid plates but includes outer walls of a building, curtain walls of constructions, and the glass of doors and windows which are of good heat-insulating capability, transparency, and luminosity.

Another object of the present invention is to provide a laminated ornamental glass which can be produced by directly printing on one of the surfaces of a sheet of glass substrate a coating layer having opaque colored regions arranged in an array or net composed of figures selected from the group consisting of circles, tetragons, and hexagons, a white paint coating layer and a black or grey oil ink coating layer then in turn being printed with the same pattern (or figures) over the colored coating layer.

A further object of the present invention is to provide a laminated ornamental glass which can be optionally adjusted to the desired degree of interior luminosity and transparency thereof by changing the ratio of the sizes of the coating layers to the crevice portions between the coating layers.

Still another object of the present invention is to provide a laminated ornamental glass where only the printing or coating pattern of the coating layers rather than indoor objects can be seen when viewed from the outside of the building or room, whereas outdoor objects can be seen through the coating-free crevice portions, when viewed from the inside of the building or room, such that desired indoor privacy is achieved.

Still a further object of the present invention is to provide a laminated ornamental glass composed of a sheet of transparent or light-colored, flat or bent, reinforced glass or ion exchange reinforced glass and three coating layers, printed or coated on one of the surfaces of said glass, whose materials are selected from the group consisting of heat resistant ceramic color frit and enamel and said glass with coating layers printed or coated thereon may further be laminated with a polyester film or a polycarbonate resin film.

An even further object of the present invention is to provide a laminated ornamental glass which may be coated with a metallic oxide film other than the aforementioned coating layer having colored patterns to render a mirror-reflecting effect making it a heat ray reflecting glass with high heat-insulation and high monodirectional-reflection of luminosity.

Still a further object of the present invention is to provide a laminated ornamented glass on which no reflected image of interior objects, duplicated virtual image, or distorted static image will occur when viewed from the inside of a building or room.

The term "array" is to be understood as including, for example, stripes which may be parallel one embodiment of the present invention consists of a laminated ornamental glass while other embodiments of the invention are to be understood as including laminated ornamental plastics materials.

SUMMARY OF THE INVENTION

According to the present invention, a laminated ornamental glass comprises:

a) a sheet of transparent or light-colored glass;

b) a first coating layer having opaque regions arranged in an array or net which-h has been printed or coated on one side of said glass by a conventional screen printing method or otherwise, with said first coating layer leaving transparent coating-free crevice portions between said opaque regions; and c) a second, white coating layer and a third, black or grey oil ink coating layer with the same pattern as that of said first layer which have been printed or otherwise applied over said first coating layer;

wherein said glass with said three coating layers printed or otherwise thereon is subject to a heat treatment under the temperature ranging from 600° C. to 650° C. after said three coating layers have dried.

In the case that the laminated ornamental glass of the present invention is to be in a bent shape, it can be obtained by heating the flat glass with aforesaid coating layers printed or otherwise thereon mounted in a mold having the desired bent shape after said coating layers have dried and before said glass is subject to aforementioned heat treatment.

Preferably, the laminated ornamental glass can be obtained by first directly printing or coating a glazed painting or a netted- or striped-figure selected from the group consisting of circles, tetragons, and hexagons, by conventional screen printing on one side of a sheet of glass substrate, a second white paint coating layer and a third black or grey oil ink coating layer then in turn being printed or coated with the same pattern (circles, tetragons or hexagons) as that of the first coating layer over the glazed painting or netted- or striped-figure coating layer, and being subjected to a heat treatment under the temperature ranging from 600° C. to 650° C. when said coating layers have dried.

Since the figures of each coating layer contain a coating-free crevice portion, only the printing or coating pattern of the coating layers rather than indoor objects can be seen when viewed from the outside of the building or room, whereas the black or grey coating pattern composed of, for example, circles, tetragons, or hexagons can be seen as well as outdoor objects can be seen through the coating-free crevice portions when viewed from the inside of the building or room. Therefore, the interior luminosity of the present invention is adjustable by simply changing the ratio of the sizes of the opaque coating patterns to the coating-free transparent crevice portions, for example, the rate of transparency can be adjusted from 3% to 65% depending upon the need.

The glazed painting, white paint and oil ink employed for the opaque coating layers are primarily prepared by mixing conventional heat-resistant ceramic color frit such as CaO, MnO, CdS, $Cr_2O_3$ or $Fe_2O_3$ 15 to 70 wt % with glass powder 30 to 85 wt % (the weight percentage is based on the total weight of the mixture obtained therefrom); most preferably the content of the ceramic color frit is no more than 30 wt % and that of the glass powder is no less than 30 wt % so that the adhesive force can be prevented from deterioration and sufficient coloration ability of the opaque material can be rendered. As to the oil ink, the material of which is selected from polyvinyl butyryl resin, urethane, methyl acrylate resin and epoxy resin or a mixture thereof. And the thickness of each coating layer may range from 0.04 mm to 0.18 mm.

As said coating layers will not fade under sunshine due to the use of heat-resistant ceramic color frit as material, the laminated ornamental glass thus obtained may therefore be used not only as a glass with elegant and delicate colored patterns for outwardly-windows or curtain walls of buildings but also as an ornamental inlaid material for outer walls of constructions. In addition, no virtual images of indoor objects, duplicated images, or distorted static images can be seen on the surface of the laminated ornamental glass in which the coating layers are of opaque materials. In the meantime, the laminated ornamental glass of this invention may be laminated with a polyester or polycarbonate resin plate to cover the coating layers, thereby rendering an impact-resistant effect depending upon applications.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The patent or the application file contains at least one drawing executed in color. Copies of this patent or patent application publication with color drawing(s) will be provided by the office upon request and payment of the necessary fee.

Figure 1:
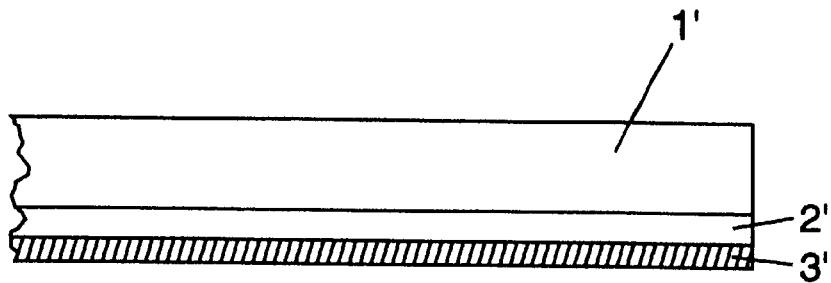
Figure 2:
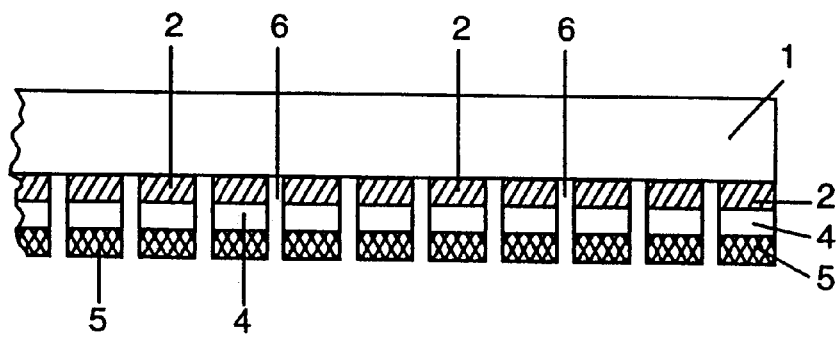
Figure 3:
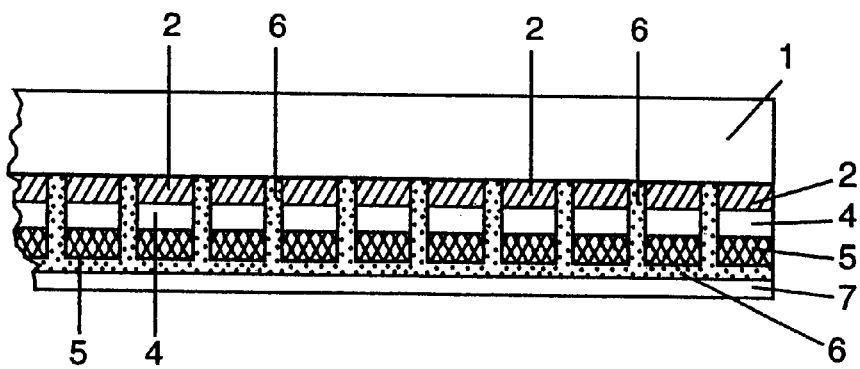
Figure 4A:
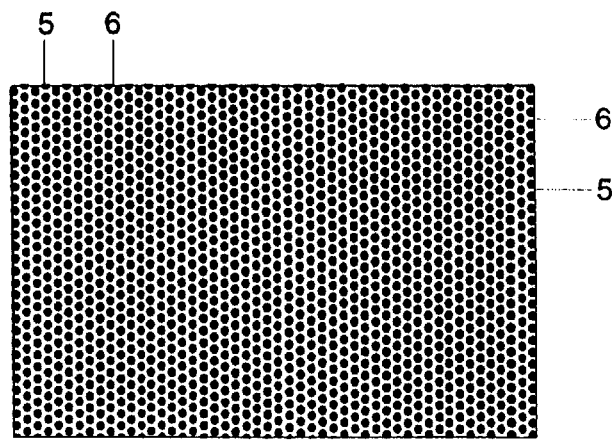
Figure 4B:
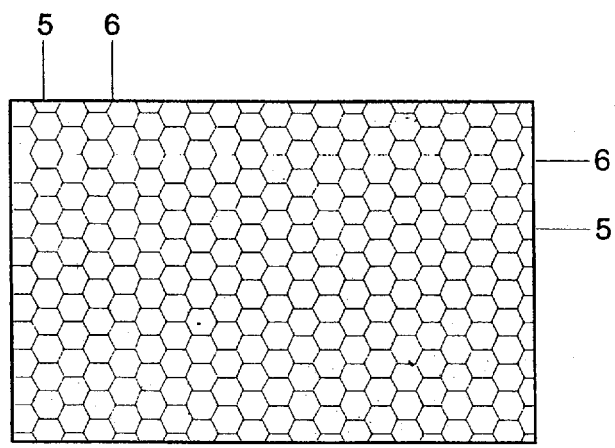
Figure 4C:
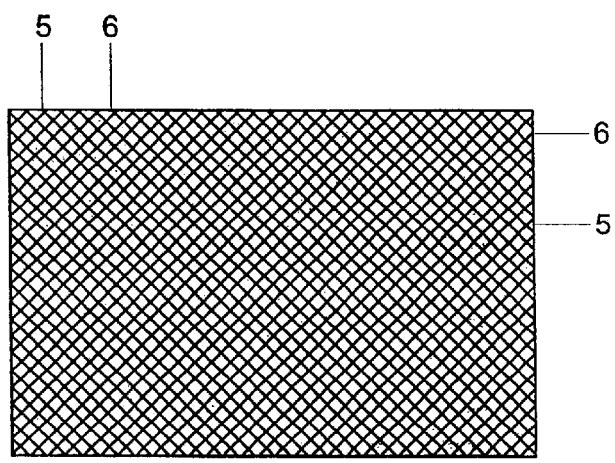
Figure 5A:
Figure 5B:
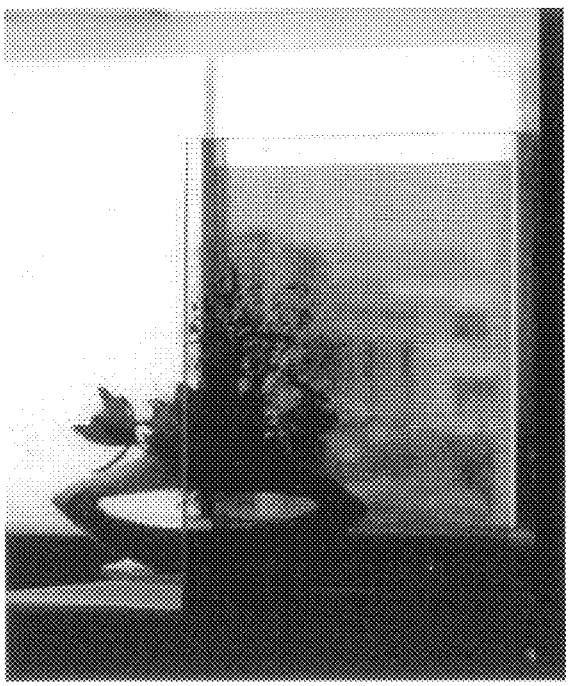
Figure 6A:
Figure 6B:
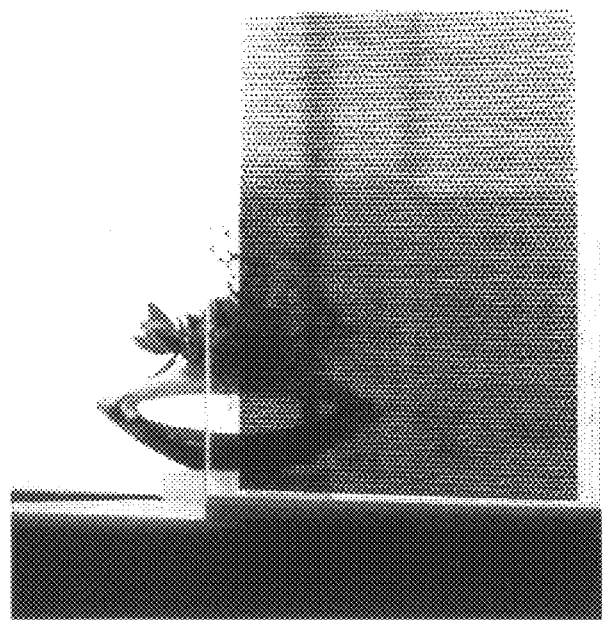

Laminated ornamental glass according to the present invention, and the prior art, will now be described in greater detail with reference to the accompanying drawings, in which:

FIG. 1 is an enlarged cross-sectional view of the structure of a conventional laminated ornamental glass;

FIG. 2 is an enlarged cross-sectional view of the structure of an embodiment of the present invention;

FIG. 3 is an enlarged cross-sectional view of the structure of another embodiment of the present invention;

FIG. 4(*a*) is a view of a pattern composed of circles employed in this invention when viewed from inside;

FIG. 4(*b*) is a view of a pattern composed of hexagons employed in this invention when viewed from inside;

FIG. 4(*c*) is a view of a pattern composed of tetragons employed in this invention when viewed from inside;

FIG. 5(*a*) is a view of a glazed pattern on the laminated ornamental glass of this invention with a pattern composed of circles employed as a part of an interior window when viewed from outside;

FIG. 5(*b*) is the opposite side view of FIG. 5(*a*);

FIG. 6(*a*) is the same glazed painting view as in FIG. 5(*a*) except that a hexagonal pattern is used instead of circles; and FIG. 6(*b*) is the opposite side view of FIG. 6(*a*).

DETAILED DESCRIPTION OF THE INVENTION

Conventional laminated ornamental glass, as shown in FIG. 1, is composed of a sheet of transparent or light-colored glass substrate 1', an opaque glazed or enamel coating layer 2' with desired color, painting, or figures printed or coated on one side of said glass substrate 1', and a black enamel or glazed coating layer or a resin protective layer 31 printed or coated over the coating layer 2'. In other words, the glazed or enamel coating layer 2' with color or figures is printed or coated on one entire surface of the glass substrate 1', whereby the conventional laminated ornamental glass is essentially a non-transparent glass substrate with opaque coating layers printed thereon. As the conventional laminated ornamental glass thus obtained cannot be seen through, it can only be used for interior partitions or as an inlaid material for inner walls of buildings, rather than being used as an inlaid material for outer walls or the glass for outwardly-facing windows or curtain walls of building.

In FIG. 2 to FIG. 4, 1 is a transparent or translucent glass substrate which is selected from sodium calcium silicates reinforced glass with or without heat treatment or sodium, potassium ion exchange reinforced glass; 2, 4 and 5 are each a coating layer having an array of intercrossing stripes or a net configuration composed of circles, hexagons or tetragons, which are directly in turn printed by screen printing or coated on one side of said transparent glass substrate 1 wherein 2 is a glazed painting or other pattern coating layer, 4 is a white paint coating layer and 5 is a black or grey oil ink coating layer which together leave crevice portions 6 without any coating between the opaque patterned coating layers 2, 4 and 5; each coating layer is of thickness ranging from 0.04 mm to 0.18 mm.

Referring to FIG. 3, the structure of the embodiment is the same as that shown in FIG. 2 except the crevice portions 6 is filled with a transparent adhesive 6' in the process of bonding a transparent protective base plate 7' of polyester or polycarbonate resin.

A metallic oxide coating layer with a mirror-reflecting effect instead of aforesaid glazed painting or other pattern coating layer may be printed or coated by a reflecting film treatment such as the application of the conventional vacuum deposition method or thermal decomposition oxidation film method on the glass substrate in a thickness ranging from 400A to 1800A to render the glass substrate a heat ray reflecting glass. Said metallic oxide is an oxidation paste selected from gold, silver, platinum, copper, tin, zinc, chromium, titanium, aluminum or nickel, or an alloy thereof.

The special features of the present invention are especially understood in terms of FIG. 5 and FIG. 6.

FIG. 5(*a*) and FIG. 6(*a*) both show that no indoor objects but instead a glazed marble-pattern painting is seen when viewed from the outside, with the aforementioned coating-free crevice portions 6 being seen only obscurely. On the other hand, FIG. 5(*b*) and FIG. 6(*b*) show that it is possible to see outdoor objects through said coating-free crevice portions 6 of the laminated ornamental glass of the invention when viewed from the inside.

What is claimed is:

1. A laminated ornamental glass comprising:

a sheet of a transparent glass having a pair of sides;

a first coating layer comprised of an array of opaque regions and transparent regions applied to one side of said glass, each of said transparent regions of said array interconnected together and having an equal and generally geometrically shaped cross-sectional area, each of said opaque regions of said array being individually interdigitized between each of said transparent regions such that each of said opaque regions has a substantially equal cross-sectional area which is dependently defined by said cross-sectional area of said transparent region, a ratio of said transparent and opaque cross-sectional areas defining a rate of transparency of said glass;

a second coating layer comprised of an array of white paint regions corresponding with the same array of said first coating layer, and disposed only on a top of said opaque regions of said first coating layer, said second coating layer leaving a same transparent coating-free crevice regions between said white paint regions;

a third coating layer comprised of an array of one of a black and a gray oil ink region, corresponding to the same array of said first and second layers and disposed on a top of said white paint regions of said second coating layer, said third coating layer leaving said same transparent coating-free crevice regions between said black and gray oil ink regions, and wherein said first layer is comprised of 15 to 70% by weight of ceramic color frit and 30 to 85% by weight of glass powder, said first layer protecting said ornamental glass from oxidation and ultraviolet attack after all of said layers are subjected to a heat treatment at a temperature ranging from 600–650° C., said heat treatment being performed after each of said three layers have air-dried.

2. The laminated ornamental glass according to claim 1, wherein the content of the ceramic color frit is not more than 30% by weight and that of the glass powder is not less than 30% by weight.

3. The laminated ornamental glass according to claim 1, wherein each of said first, second and third coating layers has a thickness of between 0.04 mm and 0.18 mm.

4. The laminated ornamental glass according to claim 1, wherein transparent regions are selected from a group consisting of parallel lines circles, tetragons and hexagons.

5. The laminated ornamental glass according to claim 1, wherein an increase in said cross-sectional area of said transparent region corresponds to a decrease in said cross-sectional area of said opaque region, thereby increasing luminosity within said building.

6. The laminated glass of claim 5, further including one of a polyester and polycarbonate resin applied over said one side of said glass in order to provide each of said coating layers with impact resistance, said resin applied after heat treating.

7. The laminated glass of claim 6, wherein said resin layer is attached to said coating layers with a transparent adhesive.

8. The laminated ornamental glass according to claim 1, wherein the transparent regions collectively permit visibility through the glass when viewed from the one side of the glass but not when viewed from another side of the glass.

9. The laminated ornamental glass according to claim 1, wherein the rate of transparency of the glass is adjustable in a range between 3–65% so as to variably control a luminosity inside the building.

10. The laminated ornamental glass according to claim 9, wherein the rate of transparency of the glass is adjustable in a range of 3–10% so as to control a luminosity inside the building.

11. The laminated ornamental glass according to claim 9, wherein the rate of transparency is adjustable between 11–30% so as to variably control a luminosity inside the building.

12. The laminated ornamental glass according to claim 9, wherein the rate of transparency of the glass is adjustable in a range between 31–65% so as to variably control a luminosity inside the building.

13. The laminated ornamental glass comprising:

a sheet of a translucent glass having a pair of sides;

a first coating layer comprised of an array of opaque regions and transparent regions applied to one side of said glass, each of said transparent regions of said array interconnected together and having an equal and generally geometrically shaped cross-sectional area, each of said opaque regions of said array being individually interdigitized between each of said transparent regions such that each of said opaque regions has a substantially equal cross-sectional area which is dependently defined by said cross-sectional area of said transparent region, a ratio of said transparent and opaque cross-sectional areas defining a rate of transparency of said glass;

a second coating layer comprised of an array of white paint regions corresponding with the same array of said first coating layer, and disposed only on a top of said opaque regions of said first coating layer, said second coating layer leaving a same transparent coating-free crevice region between said white paint regions;

a third coating layer comprised of an array of one of a black and a gray oil ink region, corresponding to the same array of said first and second layers and disposed on a top of said white paint regions of said second coating layer, said third coating layer leaving said same transparent coating-free crevice regions between said black and gray oil ink regions, and wherein said first layer is comprised of 15 to 70% by weight of ceramic color frit and 30–85% by weight of glass powder, said first layer protecting said ornamental glass from oxidation and ultraviolet attack after all of said layers are subjected to a heat treatment at a temperature ranging from 600–650° C., said heat treatment being performed after each of said three layers have air-dried.

14. The laminated ornamental glass according to claim 13, wherein the content of the ceramic color frit is not more than 30% by weight and that of the glass powder is not less than 30% by weight.

15. The laminated ornamental glass according to claim 13, wherein transparent regions are selected from a group consisting of parallel lines, circles, tetragons and hexagons.

16. The laminated ornamental glass according to claim 13, wherein an increase in said cross-sectional area of said transparent region corresponds to a decrease in said cross-sectional area of said opaque region, thereby increasing luminosity within said building.

17. The laminated glass of claim 16, further including one of a polyester and polycarbonate resin applied over said one side of said glass in order to provide each of said coating layers with impact resistance, said resin applied after heat treating.

18. The laminated glass of claim 17, wherein said resin layer is attached to said coating layers with a transparent adhesive.

19. The laminated ornamental glass according to claim 13, wherein the transparent regions collectively permit visibility through said glass when viewed from said one side of said glass but not when viewed from another side of said glass.

20. The laminated ornamental glass according to claim 13, wherein the rate of transparency of the glass is adjustable in a range between 3–65% so as to variably control a luminosity inside the building.

21. The laminated ornamental glass according to claim 20, wherein the rate of transparency of the glass is adjustable in a range of 3–10% so as to control a luminosity inside the building.

22. The laminated ornamental glass according to claim 20, wherein the rate of transparency of the glass is adjustable 11–30% so as to variably control a luminosity inside the building.

23. The laminated ornamental glass according to claim 20, wherein the rate of transparency of the glass is adjustable in a range between 31–65% so as to variably control a luminosity inside the building.

* * * * *